(12) United States Patent
Toney

(10) Patent No.: US 7,908,848 B1
(45) Date of Patent: *Mar. 22, 2011

(54) EXHAUST APPARATUS AND METHOD FOR DIESEL DRIVEN INTERNAL COMBUSTION ENGINE

(76) Inventor: Donald Mitchel Toney, Oroville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/290,748

(22) Filed: Nov. 3, 2008

Related U.S. Application Data

(63) Continuation-in-part of application No. 12/290,748, filed on Nov. 3, 2008, and a continuation-in-part of application No. 11/441,320, filed on May 24, 2006.

(51) Int. Cl.
*F01N 3/10* (2006.01)
(52) U.S. Cl. .................. 60/307; 60/274; 60/315; 60/317
(58) Field of Classification Search .................. 60/274, 60/315–319
See application file for complete search history.

(56) References Cited

U.S. PATENT DOCUMENTS

| | | | |
|---|---|---|---|
| 3,236,045 A * | 2/1966 | Berger et al. ................. | 60/311 |
| 4,912,927 A * | 4/1990 | Billington ...................... | 60/315 |
| 6,502,392 B1 * | 1/2003 | Paas .............................. | 60/307 |

* cited by examiner

*Primary Examiner* — Thomas E Denion
*Assistant Examiner* — Jesse Bogue

(57) ABSTRACT

This embodiment of this exhaust apparatus relates to an air intake device and a rotating blade assembly (50 and 51) which significantly reduce greenhouse gases, hydrocarbon and oxides of nitrogen emissions and other gases and pollutants not yet required to be tested, exhaust noise and temperature of the exhaust gases. By its chilling effect it also improves the efficiency of an internal combustion engine. An electric motor drive shaft (69) is coupled to the drive shaft (67) at the rear of the unit. The drive shaft (66) is attached to the centrifuge and rotating blade assembly (51) creating a vacuum which draws chilled exhaust gases into the unit. The vacuum helps to cool the engine and chill the gases. The gases are mixed and the resultant gaseous mixture exits from the blades into a mixture of exhaust gases (43) and chilled air (35), making a chilled air and exhaust gas mixture (58) exiting through a discharge port in the rear of the unit (65). The test results demonstrated significant reductions in greenhouse gases and exhaust gas emissions and significantly reduced engine exhaust temperature.

8 Claims, 15 Drawing Sheets

Side View

Rear End View

SAMPLE CALCULATIONS

Hydrocarbons

Percent Reduction (PR)

$$\text{Percent Reduction} = \frac{(\text{Initial Reading} - \text{Final Reading})}{\text{Initial Reading}} \times 100$$

The reduction in HC levels for the diesel powered engine test without and with the Clean Air Turbine running was:

$PR = (17 - 0)/17 \times 100 = 100\%$

Arithmetic Difference (AD)

Arithmetic Difference = Initial Reading - Final Reading

The difference in HC levels for the diesel powered engine test without and with the Clean Air Turbine running was:

$AD = 17 - 0 = 17$ ppm difference

The same methodology was used to perform the calculations for CO, $CO_2$, $O_2$ and $NO_x$.

FIG. 8

SAMPLE CALCULATIONS

Carbon Monoxide

Percent Reduction (PR)

$$\text{Percent Reduction} = \frac{(\text{Initial Reading} - \text{Final Reading})}{\text{Initial Reading}} \times 100$$

The percent reduction in CO levels for the diesel powered engine test without and with the Clean Air Turbine running was:

PR = (0.84 - .22)/0.84 x 100 = 73%

Arithmetic Difference (AD)

The arithmetic difference in CO levels for the diesel powered engine test without and with the Clean Air Turbine running was:

Arithmetic Difference = Initial Reading - Final Reading

AD = 0.84 - .22 = 0.62% decrease

FIG. 9

TABULATED RESULTS

DIESEL ENGINE

Test 1 - 3/17/02 - 3023-3032 rpm

| Exhaust Gases[1] | Initial Reading | Final Reading | Arithmetic Difference | Percent Change |
|---|---|---|---|---|
| HC | 17.00 | 0.00 | -17.00 | -100.00 |
| CO | 1.69 | 0.75 | 0.94 | -55.62 |
| $CO_2$ | 4.40 | 1.50 | -2.90 | -65.90 |
| $O_2$ | 13.20 | 18.80 | 5.60 | 42.42 |

[1]Exhaust gas readings are expressed in percentages.
At the date of the test only four-gas (CO, $CO_2$, HC, $O_2$) emission tests were in effect.

FIG. 10

TABULATED RESULTS

DIESEL ENGINE

Test 2 - 3/17/02 - 1818-1873 rpm

| Exhaust Gases[1] | Initial Reading | Final Reading | Arithmetic Difference | Percent Change |
|---|---|---|---|---|
| HC | 11.00 | 0.00 | -11.00 | -100.00 |
| CO | 0.84 | 0.22 | -0.62 | -73.80 |
| $CO_2$ | 3.00 | 0.70 | -2.30 | -76.67 |
| $O_2$ | 16.00 | 19.50 | 3.50 | 21.87 |

Exhaust gas readings are expressed in percentages.
At the date of the test only four-gas (CO, $CO_2$, HC, $O_2$) emission tests were in effect.

FIG. 11

DIESEL ENGINE
Test
Clean Air Turbines, Inc. Exhaust Gases Monitor Test, Waukesha, Housing "A", Cent 16
Date of Test March 17, 2002

| TIME | With C.A.T. | Without C.A.T. | C.A.T. RPM | ENG RPM | HC PPM | CO% | O2% | CO2% |
|---|---|---|---|---|---|---|---|---|
| 11:49 AM | C.A.T. | | 6800 | 1840 | 3 | 0.45 | 19.60 | 1.0 |
| 11:49 AM | C.A.T. | | 6800 | 1816 | 0 | 0.43 | 19.70 | 1.0 |
| 11:50 AM | C.A.T. | | 6800 | 1821 | 0 | 0.35 | 19.70 | 1.0 |
| 11:52 AM | C.A.T. | | 5800 | 3033 | 0 | 0.75 | 18.80 | 1.5 |
| 11:57 AM | C.A.T. | | 7800 | 2990 | 6 | 0.49 | 18.70 | 1.1 |
| 11:58 AM | C.A.T. | | 7000 | 1877 | 1 | 0.24 | 19.40 | 0.8 |
| 12:00 PM | C.A.T. | | 6850 | 1873 | 0 | 0.22 | 19.50 | 0.7 |
| 12:05 PM | C.A.T. | | 7900 | 1979 | 3 | 0.25 | 19.60 | 0.7 |
| 12:08 PM | | No C.A.T. | | 1221 | 14 | 0.42 | 17.50 | 2.2 |
| 12:10 PM | | No C.A.T. | | 1818 | 11 | 0.84 | 16.00 | 3.0 |
| 12:12 PM | | No C.A.T. | | 2000 | 11 | 1.17 | 14.90 | 3.6 |
| 12:14 PM | | No C.A.T. | | 3023 | 17 | 1.69 | 13.20 | 4.4 |
| 12:15 PM | | No C.A.T. | | 1182 | 24 | 0.44 | 16.90 | 2.6 |
| 12:16 PM | | No C.A.T. | | 1191 | 15 | 0.50 | 16.90 | 2.5 |
| 12:18 PM | | No C.A.T. | | 1180 | 18 | 0.56 | 17.10 | 2.5 |
| 12:20 PM | C.A.T. | | 6700 | 1059 | 2 | 0.11 | 20.00 | 0.6 |

Sorted by time of test

SAMPLE RESULTS Engine RPM Approximately 1850 RPM

| | Without C.A.T. | With C.A.T. | Result |
|---|---|---|---|
| HC PPM | 11 | 0 | 11 PPM drop in HC with C.A.T. |
| CO% | 0.84 | 0.22 | 0.62 % drop CO% with C.A.T. |
| O2% | 16.00 | 19.50 | 3.5 % increase in oxygen, giving diminished gases |
| CO2% | 3.0 | 0.7 | 2.3 % drop in CO2% with C.A.T. |

SAMPLE RESULTS Engine RPM Approximately 3000 RPM

| | Without C.A.T. | With C.A.T. | Result |
|---|---|---|---|
| HC PPM | 17 | 0 | 17 PPM drop in HC with C.A.T. |
| CO% | 1.69 | 0.75 | 0.84 % drop CO% with C.A.T. |
| O2% | 13.20 | 18.80 | 5.6 % increase in oxygen, giving diminished gases |
| CO2% | 4.4 | 1.5 | 2.9 % drop in CO2% with C.A.T. |

FIG. 12

TEST RESULTS FOR ENGINE SPEED, AIR VELOCITY, TEMPERATURE
AND VACUUM WITH TWO DIFFERENT NOSE CONES

Centrifuge #3 18 wedge                           Date      8/26/2001
Ambient temperature              92.1            Time      PM

| RPM | Nose Cone | | Air Velocity | | | Temperature in Degrees Fahrenheit | | | | | Vacuum |
|---|---|---|---|---|---|---|---|---|---|---|---|
| RPM | Sm | Lg | Air Flow In ft/min | Air Flow Out ft/min | Air Flow Difference | Air Flow In Temp | Air Flow Out Temp | Change in Temp | Air Deflector Temp | Housing Temp | Inches $H_2O$ |
| 1500 | x |   | 340 | 780 | 440 | 88.8 | 90.8 | 2.0 | 94 | 94 | 0.1 |
|      |   | x | 400 | 830 | 430 | 89.4 | 90.1 | 0.7 | 92 | 95 | 0.1 |
| 2000 | x |   | 574 | 720 | 146 | 89.9 | 90.1 | 0.2 | 94 | 93 | 0.2 |
|      |   | x | 440 | 900 | 460 | 89.0 | 90.6 | 1.6 | 93 | 92 | 0.2 |
| 2500 | x |   | 580 | 1160 | 570 | 89.2 | 90.6 | 1.4 | 91 | 94 | 0.3 |
|      |   | x | 475 | 1060 | 585 | 89.4 | 91.0 | 1.2 | 91 | 93 | 0.3 |
| 3000 | x |   | 670 | 1500 | 830 | 89.0 | 90.8 | 1.8 | 93 | 94 | 0.9 |
|      |   | x | 749 | 1500 | 751 | 88.3 | 90.9 | 2.6 | 92 | 94 | 0.9 |
| 3500 | x |   | 750 | 1660 | 910 | 88.3 | 91.2 | 2.9 | 93 | 95 | 1.2 |
|      |   | x | 780 | 1200 | 420 | 88.7 | 91.2 | 2.5 | 92 | 94 | 1.2 |
| 4000 | x |   | 1050 | 1650 | 600 | 88.3 | 91.7 | 3.4 | 93 | 94 | 1.4 |
|      |   | x | 880 | 2030 | 1150 | 88.8 | 91.5 | 2.7 | 91 | 92 | 1.4 |
| 4500 | x |   | 950 | 2200 | 1250 | 88.5 | 91.5 | 3.0 | 92 | 93 | 1.7 |
|      |   | x | 945 | 2100 | 1155 | 88.5 | 92.4 | 3.9 | 92 | 93 | 1.7 |
| 5000 | x |   | 1380 | 2450 | 1070 | 88.4 | 92.8 | 4.4 | 94 | 95 | 2.2 |
|      |   | x | 1100 | 2700 | 1600 | 89.6 | 92.3 | 2.7 | 94 | 93 | 2.2 |
| 5500 | x |   | 1350 | 2600 | 1250 | 88.5 | 93.5 | 5.0 | 93 | 95 | 2.7 |
|      |   | x | 1140 | 2900 | 1760 | 88.4 | 93.0 | 4.6 | 91 | 92 | 2.7 |
| 6000 | x |   | 1550 | 3080 | 1530 | 89.0 | 94.4 | 5.4 | 94 | 94 | 3.3 |
|      |   | x | 1350 | 3300 | 1950 | 89.4 | 94.6 | 5.2 | 93 | 93 | 3.3 |

FIG. 13

DATA SHEET FOR CENTRIFUGE VACUUM OBTAINED WITH
SEVEN DIFFERENT CENTRIFUGE AND
BLADE CONFIGURATIONS

Test dates: 8/25/2001 without Nose Cone Collar
9/13/2001 with Nose Cone Collar

| Speed | Nose Cone | | #3 18 Flat | #3 18 Hook | #4 Oval | #5 16 Flat | 18 Wedge | 16 Hook | #5 16 Wedge |
|---|---|---|---|---|---|---|---|---|---|
| RPM | 3 inch opening | 3 1/2 inch opening | Vacuum in Inches of H2O | | | | | | |
| 1500 | x | | 0.10 | 0.50 | 0.40 | | 0.20 | 0.20 | |
|  | | x | 0.10 | 0.50 | 0.40 | | | | |
| 2000 | x | | 0.20 | 0.50 | 0.50 | 0.50 | 0.40 | 0.30 | 0.25 |
|  | | x | 0.20 | | 0.50 | 0.50 | | | |
| 2500 | x | | 0.25 | 0.80 | 0.60 | 0.60 | 0.50 | 0.50 | 0.40 |
|  | | x | 0.25 | | 0.60 | 0.60 | | | |
| 3000 | x | | 0.90 | 0.80 | 0.90 | 1.00 | 0.90 | 0.80 | 0.60 |
|  | | x | 0.90 | 0.90 | 0.90 | 1.00 | | | |
| 3500 | x | | 1.20 | 1.10 | 1.10 | 1.10 | 1.10 | 1.00 | 1.00 |
|  | | x | 1.20 | 1.10 | 1.10 | 1.10 | | | |
| 4000 | x | | 1.40 | 1.30 | 1.40 | 1.60 | 1.40 | 1.20 | 1.45 |
|  | | x | 1.40 | 1.30 | 1.40 | 1.60 | | | |
| 4500 | x | | 1.70 | 1.70 | 1.60 | 2.00 | 1.70 | 1.50 | 1.80 |
|  | | x | 1.70 | 1.70 | 1.60 | 2.00 | | | |
| 5000 | x | | 2.20 | 2.10 | 2.00 | 2.50 | 2.00 | 2.00 | 2.30 |
|  | | x | 2.20 | 2.10 | 2.00 | 2.50 | | | |
| 5500 | x | | 2.70 | 2.50 | 2.40 | 2.90 | 2.40 | 2.50 | 2.70 |
|  | | x | 2.70 | 2.50 | 2.40 | 2.90 | | | |
| 6000 | x | | 3.30 | | 2.50 | 3.20 | 3.00 | 2.80 | 3.30 |
|  | | x | 3.30 | | 2.50 | 3.20 | | | |

FIG. 14

EXHAUST APPARATUS AND METHOD FOR DIESEL DRIVEN INTERNAL COMBUSTION ENGINE

This application, which contains no new matter, is a CONTINUATION-IN-PART of application Ser. No. 12/290,748, filed 2008, Nov. 3, CIP of Ser. No. 11/441,320, filed 2006 May 24 by the present inventor. The subject matter therein is hereby incorporated by reference into this application.

CROSS REFERENCE TO RELATED APPLICATIONS

This application is a CONTINUATION-IN-PART of application Ser. No. 12/290,748, filed 2008, Nov. 3, CIP of Ser. No. 11/441,320.

FEDERALLY SPONSORED RESEARCH

Not Applicable

SEQUENCE LISTING OR PROGRAM

Not Applicable

BACKGROUND OF THE INVENTION

Field of Invention

This invention relates to an exhaust apparatus and method of an ambient air intake cooling device with a rotating blade assembly which significantly reduces air pollution in the form of greenhouse gases, hydrocarbons, oxides of nitrogen emissions and other gases and pollutants not yet required to be tested, exhaust noise and temperature of the exhaust gases. It improves the efficiency, duration and fuel economy of the underlying electromotive driver, such as a diesel driven internal combustion engine. This unit can be used to produce a major increase in both the cooling of exhaust gases, and a major increase in obtainable vacuum. This invention also finds application in improving the cooling of the steam in the operation of steam power plants, chemical plants, oil refineries, electric generating stations and cooling towers.

Background of the Invention

The embodiment of this exhaust apparatus was first conceived and built by Donald M. Toney in 1938. It was first tested in 1939 on a 4-cylinder 1930 "Model A" Ford. With the exhaust apparatus installed into the exhaust system in place of the muffler, the car was able to attain the speed of over 79 miles per hour. Without the exhaust apparatus, approximately 60 miles per hour was as fast as could be attained. The car was able to go 19 miles per hour faster with the exhaust apparatus installed than without the exhaust apparatus. After the test the oil pan was removed to inspect the rod and main bearings. It was found, surprisingly, that there was no damage to any of the bearings in the scoop oil system.

In 1963 the device was re-designed and built a new exhaust apparatus of different metals to test the control of steam. It was discovered that the exhaust apparatus was able to change 500 degree live steam to liquid water with a temperature of 90 degrees in only 24 inches.

The device was installed an exhaust apparatus in a 4-cylinder Ford Pinto and was able to accelerate faster than a Ford V/8.

In 1978 the device was installed an exhaust apparatus in a 1972, 1800 cc Volkswagen and was able to skid the back tires for 20 feet in low gear, 10 feet in second gear, to speeds of approximately 70 mph in ⅓ of a mile. With the exhaust apparatus installed and the vacuum it created, the engine was so cooled that the number 3 cylinder was no longer a heat problem.

In 2000 and 2001 the device was redesigned, re-built and tested over a 15 month period, with a resulting new model of the exhaust apparatus.

Seven new blade arrangements for the device were made to find the most effective arrangement and the front housing was redesigned for more efficient cooling to the mixing chamber. The device was able to attain 1800 to 2000 RPM over the red line for the engine without any damage to the bearings. The oil temperature was about 93 degrees instead of 190 degrees, which would extend the life of the viscosity of the oil. The vacuum created by the exhaust apparatus cooled the metal of the engine by relieving the exhaust gas so rapidly that almost no carbon remained in the cylinder or valve ports. This vacuum relieved the exhaust so rapidly, that the back pressure was nearly nil and valve floating was overcome, letting the engine attain much higher RPM. With temperature lowered metal fatigue is greatly lessened. All this was accomplished with handmade parts. With perfect casting of extrusion of parts, the efficiency will be greatly increased.

Prior Art

U.S. Pat. No. 4,912,927 describes a prior air intake device and a rotary fan blade (rotating blade) assembly. Intake air contacts the exhaust gases in a counter-flow direction, that is, in a direction opposite to the direction of flow of exhaust gases.

The major differences between U.S. Pat. No. 4,912,927 (prior unit) and application Ser. No. 12/290,748 (this exhaust apparatus) are, this exhaust apparatus produces a major reduction in:
  (a) Greenhouse gases (CO and $CO_2$). (See FIGS. 10-15.)
  (b) Hydrocarbon emissions (HC). (See FIGS. 10-15.)
  (c) Oxides of nitrogen emissions ($NO_x$). (See FIGS. 10-15)
In addition this exhaust apparatus produces:
  (d) Virtually no unburnt fuel remaining in combustion chamber.
  (e) A major increase in cooling of exhaust gases. (See FIGS. 13 and 14.)
  (f) A major increase in engine vacuum compared to the prior art. (See FIG. 13.)
  (g) The prior unit is driven from the front and must be driven by a belt-drive assembly, which limits its mounting location, and its ability to be mounted to modern engine's belt system. This exhaust apparatus is driven from the rear and is electrically driven and can be mounted almost anywhere.
  (h) The prior unit contains a rotating mixing chamber, whereas in this embodiment of the exhaust apparatus the cooling chamber is stationary.
  (i) This embodiment of the exhaust apparatus has fewer moving parts, is easier to manufacture and assemble.
This embodiment of the exhaust apparatus reduces the following engine performance parameters:
  (a) Back-pressure. (See FIG. 13.)
  (b) Exhaust noise. (See FIG. 14.)
  (c) Engine temperature. (See Background—Field of Invention.)
  (d) Exhaust temperature. (See Background—Field of Invention.)

(e) Exhaust pollutants. (See FIGS. 10-14.)
Additionally this unit provides:
 (f) Extended engine life. (See Background—Field of Invention.)
 (g) Extended oil life. (See Background—Field of Invention.)
 (h) Relief of crystallization of engine parts. (See FIGS. 10-14)
 (i) Increased power. (See Background—Field of Invention.)
 (j) Greater engine efficiency. (See FIGS. 13 and 14.)
 (k) Reduced fuel consumption. (See Background—Field of Invention.)

BRIEF SUMMARY OF THE INVENTION

This invention relates to an exhaust apparatus and method of an ambient air intake cooling device with a rotating blade assembly. The embodiment of the exhaust apparatus consists of three main sections, the front section which contains an air deflector and mixing chamber, a middle section contains a centrifuge and rotating blade assembly and a rear section which contains deflecting blades and drive mechanism.

The idea of the invention of this exhaust apparatus is to make a unit that can be mounted anywhere on a vehicle and work properly without a lot of alterations to the vehicle.

This embodiment of the exhaust apparatus would give greater fuel mileage and cool the engine, relieving the backpressure on the pistons by creating a high vacuum in the exhaust pipes to take away any unburnt fuel. This also relieves crystallization and carbonization of the engine's parts.

This allows the valves to work normally without a floating condition. Without unnecessary backpressure in the exhaust valve port area there is less pressure of the down stroke of the pistons on the rod bearings at the crankshaft, letting the engine run at higher revolutions per minute without any damage to the bearing surfaces. This also lengthens the life of the rod-bearings and the polished area of the crankshaft, thereby lengthening the life of the engine.

This embodiment of the exhaust apparatus also cools the engine, cutting down the high heat in the piston and valve port areas lessening the crystallization of the engine's metal, making the engine last much longer. Removing the hot, unburned fuel gases lets the piston ring springs maintain their expansion without becoming fouled. This allows the engine to run longer without the necessity of costly repairs. Cutting down wear of the engine's parts extends the engine's life by thousands of miles before overhaul of the engine is necessary.

Safer, cooler exhaust temperatures are accomplished by the vacuum created by the exhaust apparatus in the exhaust pipes from the engine to the exhaust apparatus. Normal temperature at the end of an exhaust tail pipe is approximately 750 to 1200 degrees Fahrenheit, whereas with the exhaust apparatus installed, the temperature becomes much cooler. The temperature at the engine's exhaust ports is approximately 500 degrees Fahrenheit. The exhaust apparatus drops the temperature so rapidly by its vacuum that in a short distance the temperature drops to approximately 100 to 150 degrees. The temperature of the discharging of the exhaust gases and chilled air from the turbine cools down to approximately 97 to 140 degrees. You may comfortably place your hand on the surface of the rear housing without discomfort from exhaust heat. See FIG. 15.

Since the exhaust apparatus has only one moving part, the simplicity of its design leaves very little to maintain and align, which should be able to be accomplished by any good automobile mechanic. Driven by an electric motor, the exhaust apparatus could be placed in place of the muffler system, making a clean installation where it would be very easy to service.

The exhaust apparatus can be placed anywhere in the exhaust system of any Otto cycle vehicle. This exhaust apparatus has the ability to replace the muffler system, resonator and tailpipes, since the exhaust pipes from each bank of the engine are fed directly into the exhaust apparatus for eliminating most of the harmful exhaust gases. See FIG. 15.

With the addition of the exhaust apparatus, the modern Otto cycle engine could be free-breathing again. It has the ability to eliminate most of the electronic controls of the smog equipment mounted on the engine. The catalytic burner could also be removed as the exhaust apparatus eliminates the need for this equipment.

By using an electric drive we are able to control the revolutions per minute desired for best performance.

The exhaust apparatus has the ability to clean and cool the exhaust system to the extent that the existing emissions become so low that they surpass the 2012 emission requirements. See FIGS. 10-15. With the exhaust apparatus in operation, the backpressure from the valve ports is relieved to give approximately an 1800-2000 increase in revolutions per minute without endangering engine parts.

BRIEF DESCRIPTION OF THE SEVERAL VIEWS OF THE DRAWINGS

Figures

FIG. 8 shows the sample calculations for the percentage reduction and arithmetic difference in hydrocarbon emissions.

FIG. 9 shows the sample calculations for the percentage reduction and arithmetic difference in carbon monoxide emissions.

FIG. 10 shows the tabulated results for the percentage change and arithmetic difference calculations for exhaust gas emissions produced by a diesel powered engine, with and without the unit running.

FIG. 11 shows the tabulated results for the percentage change and arithmetic difference calculations for exhaust gas emissions produced by a diesel powered engine, with and without the unit running.

FIG. 12 shows a compilation of tabulated test results for the percent change in emissions for a series of four gas emission tests of a diesel powered engine.

FIG. 13 shows the test data and sample results for diesel engine speed, air velocity, temperature and vacuum with two different nose cones, tests performed on 2001 Aug. 26.

FIG. 14 shows the data sheet for centrifuge vacuum obtained with seven different centrifuge and blade configurations, at different RPM with and without nose cone collar, performed on 2001 Aug. 25 and 2001 Sep. 13.

DRAWINGS

Figure 1:
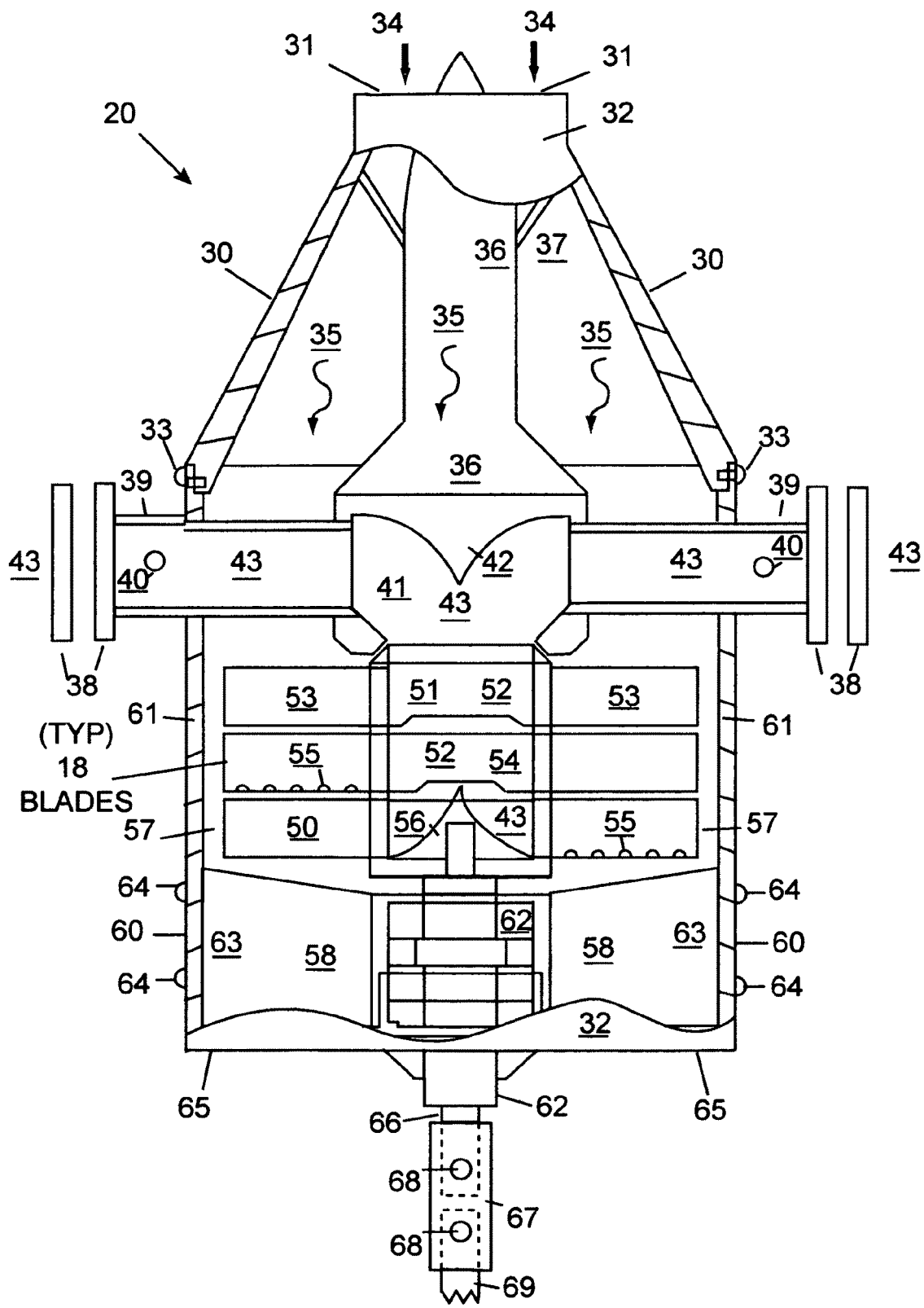
FIG. 1 shows a partial cross-section and side elevation of the unit, with the placement of all the parts.

Reference Numerals 20 exhaust apparatus
30 front housing
31 ambient air inlet port
32 outer wall of front housing
33 fastening screws (8)
34 ambient air
35 chilled air
36 chilling air deflector and mixing chamber
37 chilling, deflecting and supporting blades (4)
38 engine exhaust and embodiment of the exhaust apparatus entrance flanges
39 embodiment of the exhaust apparatus exhaust gas intake pipes
40 vacuum sampling ports
41 exhaust gas chilling and mixing chamber
42 centrifuge front deflector
43 exhaust gases
50 centrifuge and rotating blade assembly
51 centrifuge mixing chamber
52 deflecting collars
53 exhaust gas deflecting blades (18)
54 deflecting blade exhaust gas entry ports
55 deflecting blade exhaust gas exit ports
56 centrifuge rear deflector
57 clearance space between blade assembly and rear housing
58 chilled air and exhaust gas mixture
60 rear housing
61 uniform cross-sectional wall
62 rear bearing housing
63 deflecting blades and rear bearing housing supports
64 rear support adjusting screws (12)
65 chilled air and exhaust gas mixture discharge port
66 drive shaft
67 drive shaft coupling
68 drive shaft coupling bolts
69 electric motor drive shaft
70 electric motor
71 exhaust pipes
72 engine exhaust flange
73 engine

DETAILED DESCRIPTION OF THE INVENTION

The embodiment of the exhaust apparatus 20 consists of three sections, a front section, a middle section assembly and a rear section. The front section consists of a front housing 30 which features a conically shaped outer wall 32, an ambient air inlet port 31. The front housing 30 is fastened to the rear housing 60 with eight fastening screws 33. The centrifuge and rotating blade assembly 50, draws ambient air 34 into the ambient air inlet port 31. The ambient air 34 passes over the chilling air deflector and mixing chamber 36. The ambient air 34 is chilled by the front housing 30, chilling air deflector and mixing chamber 36, and the four chilling, deflecting and supporting blades 37. The chilled air 35 moves past chilling, deflecting and supporting blades 37 and moves over the exhaust gas intake pipes 39 and the exhaust gas chilling and mixing chamber 41, chilling both items and fills the clearance space between blade assembly and rear housing 57 and passes over the exhaust gas deflector blades 53 of the centrifuge and rotating blade assembly 50.

Engine exhaust gases 43 are drawn into the unit, passing through engine exhaust and exhaust apparatus entrance flanges 38 and exhaust apparatus exhaust gas intake pipes 39, which each contain a vacuum sampling port 40. The exhaust gases 43 continue into exhaust gas chilling and mixing chamber 41 and contact centrifuge front deflector 42, which deflects the exhaust gases 43 into centrifuge and rotating blade assembly 50. All of the items in the front section are made of aluminum, except the fastening screws 33 which are tempered-steel Allen head screws.

The middle section contains centrifuge and rotating blade assembly 50 which draws exhaust gases 43 into centrifuge mixing chamber 51. The exhaust gases 43 are drawn past deflecting collars 52 and enter the exhaust gas deflector blades 53 by way of blade exhaust gas entry ports 54, which are in the bottom of exhaust gas deflector blades 53. Exhaust gases 43 then exit blades 53 via blade exhaust gas exit ports 55. While in the mixing chamber 51, exhaust gases 43 also strike centrifuge rear deflector 56, which deflects the gases upwards and into the entry ports 54 and helps equalize and maintain the flow of exhaust gases 43. Exhaust gases 43 mix with chilled air 35 in clearance space between blade assembly and rear housing 57 and in the region around and beyond the center blades of the centrifuge and blade assembly 50.

The rear section consists of rear housing 60, which contains a uniform cross-sectional wall 61, rear bearing housing 62, deflecting blades and rear bearing housing supports 63 which are fastened by rear support adjusting screws 64. Rear support adjusting screws 64 permit motion of rear bearing housing supports 63 which permit adjustment of centrifuge and rotating blade assembly 50. Rear bearing housing 62 holds the rear bearing, which is not shown, supporting drive shaft 66, which is fastened to centrifuge and rotating blade assembly 50 with two machine screws, which are not shown, and drives the centrifuge and rotating blade assembly 50, which draws the gases into the exhaust apparatus 20 invention.

Drive shaft coupling 67 is attached to drive shaft 66 by drive shaft coupling bolts 68. An electric motor shaft 69 is inserted into outer end of drive shaft coupling 67 and drives drive shaft 66. The chilled air and exhaust gas mixture 58 exits the unit through chilled air and exhaust gas discharge port 65.

Figure 2:
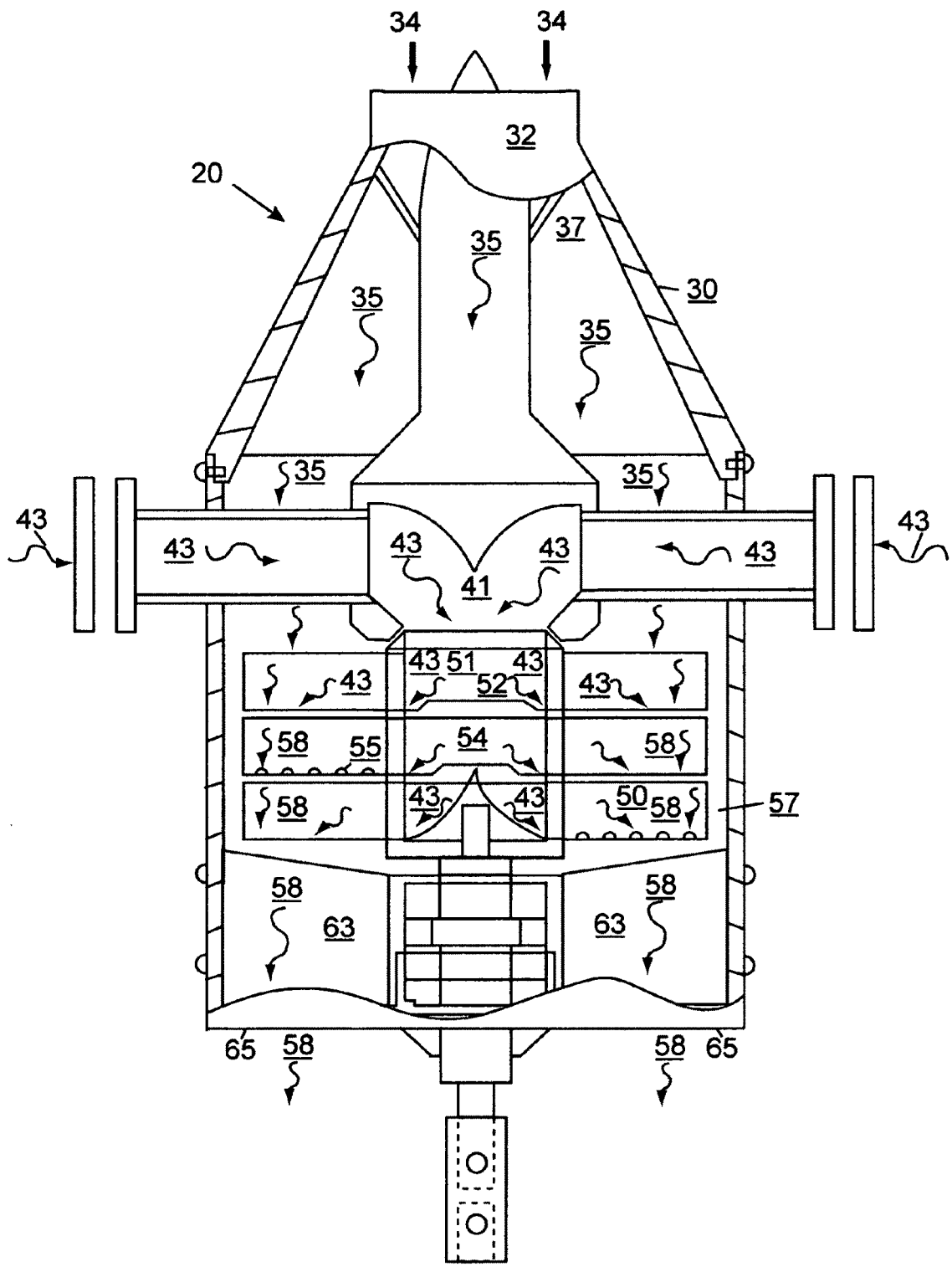
FIG. 2 shows a schematic representation of the ambient air, chilled air, chilled exhaust gas and gaseous mixture flows. (See FIG. 13 showing Test Results for Engine Speed, Chilled Air Velocity, Temperature and Inches of Vacuum.)

FIG. 2 shows the flow of ambient air 34, chilled air 35, exhaust gases 43 and the chilled air 35 and chilled air and exhaust gas mixture 58 at the various places in unit leaving the unit. This figure omits a view of the electric motor shaft.

Figure 3A:
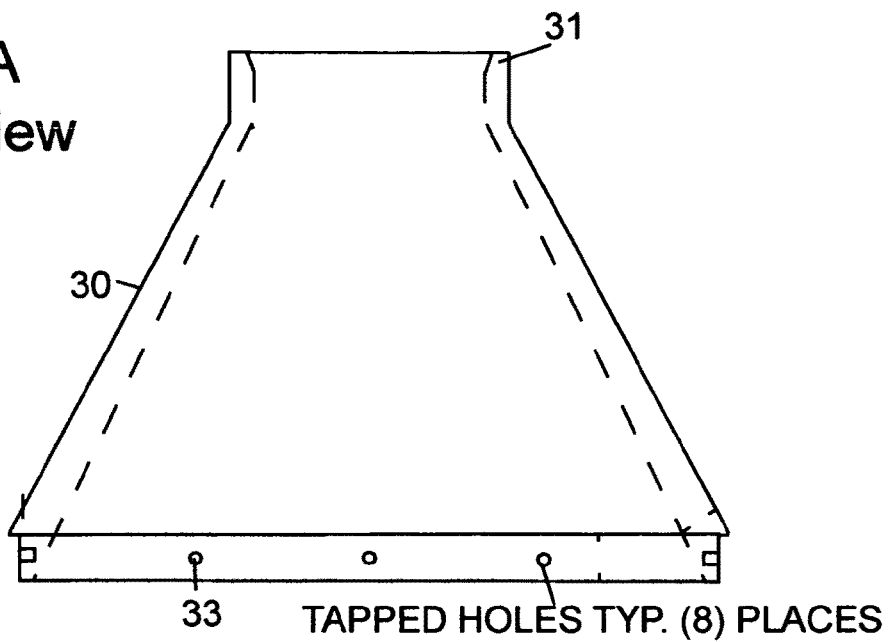
FIGS. 3A and 3B show a side view (3A) and end view (3B) of the front housing.
Figure 3B:
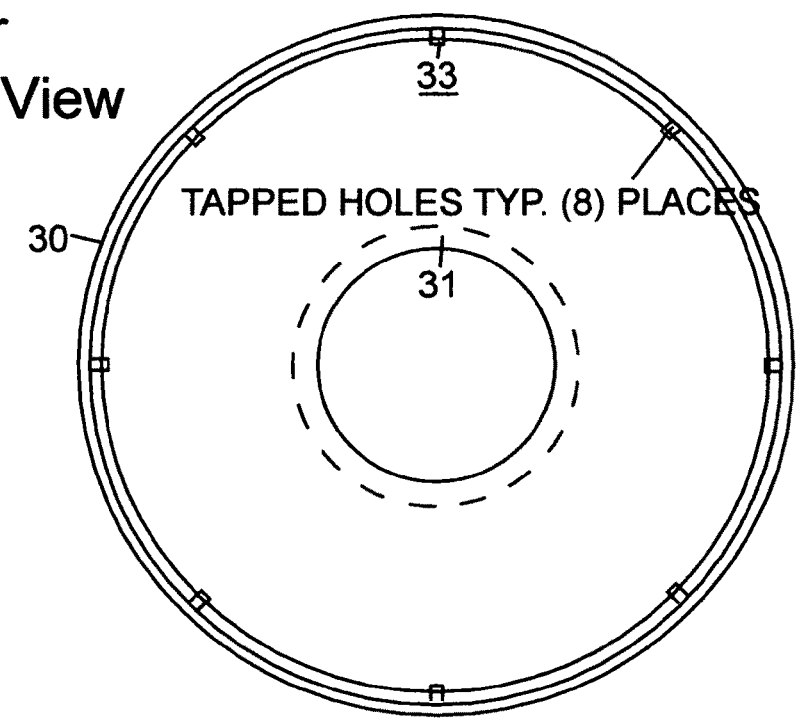

FIG. 3 shows a side view (3A) and end view (3B) of the front housing 30, eight tapped holes 33 for fastening the front housing to the rear housing and ambient air inlet port 31.

Figure 4:
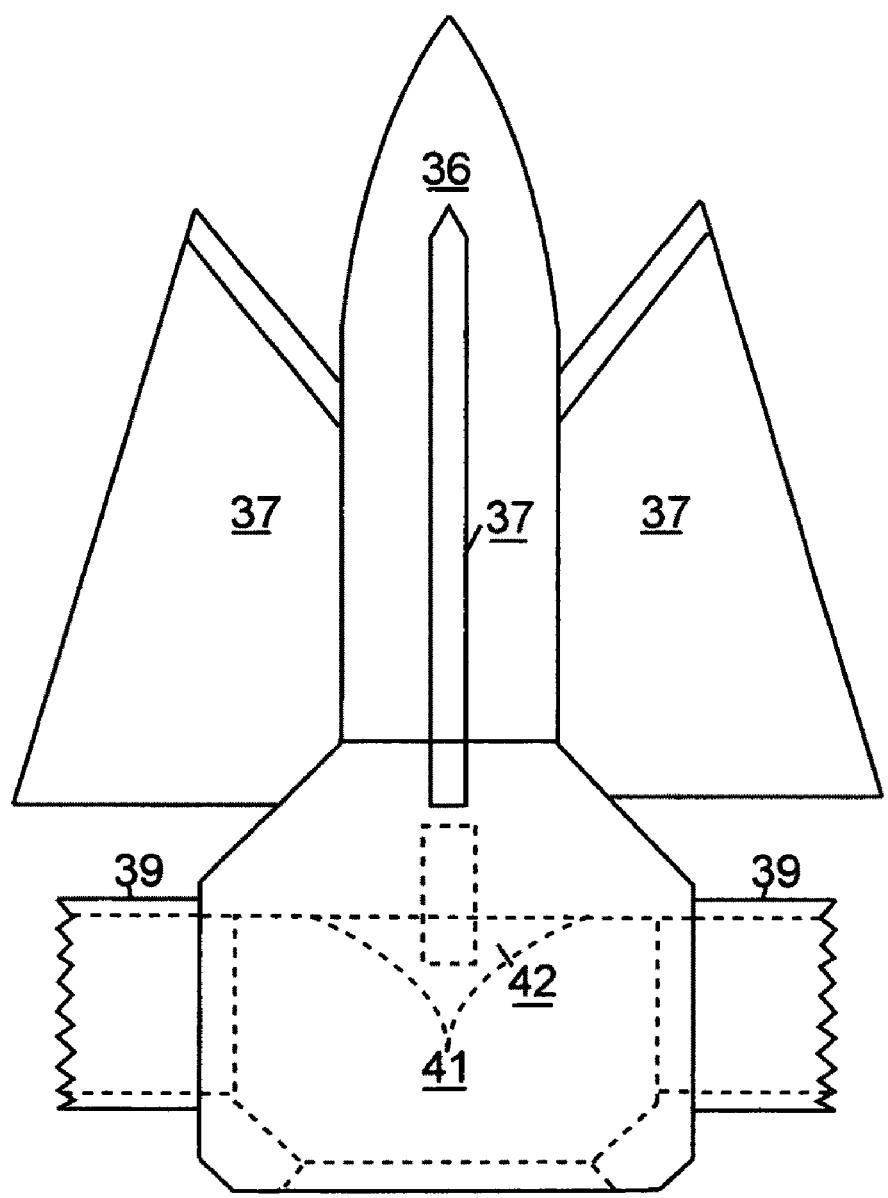
FIG. 4 shows a side view of the chilling air deflector, blades, mixing chamber, and exhaust gases intake pipe.

FIG. 4 shows a top view of the chilling air deflector 36, 3 of the 4 chilling, deflecting and supporting blades 37, exhaust apparatus exhaust gas inlet pipes 39, exhaust gas chilling and mixing chamber 41, and centrifuge front deflector 42.

Figure 5:
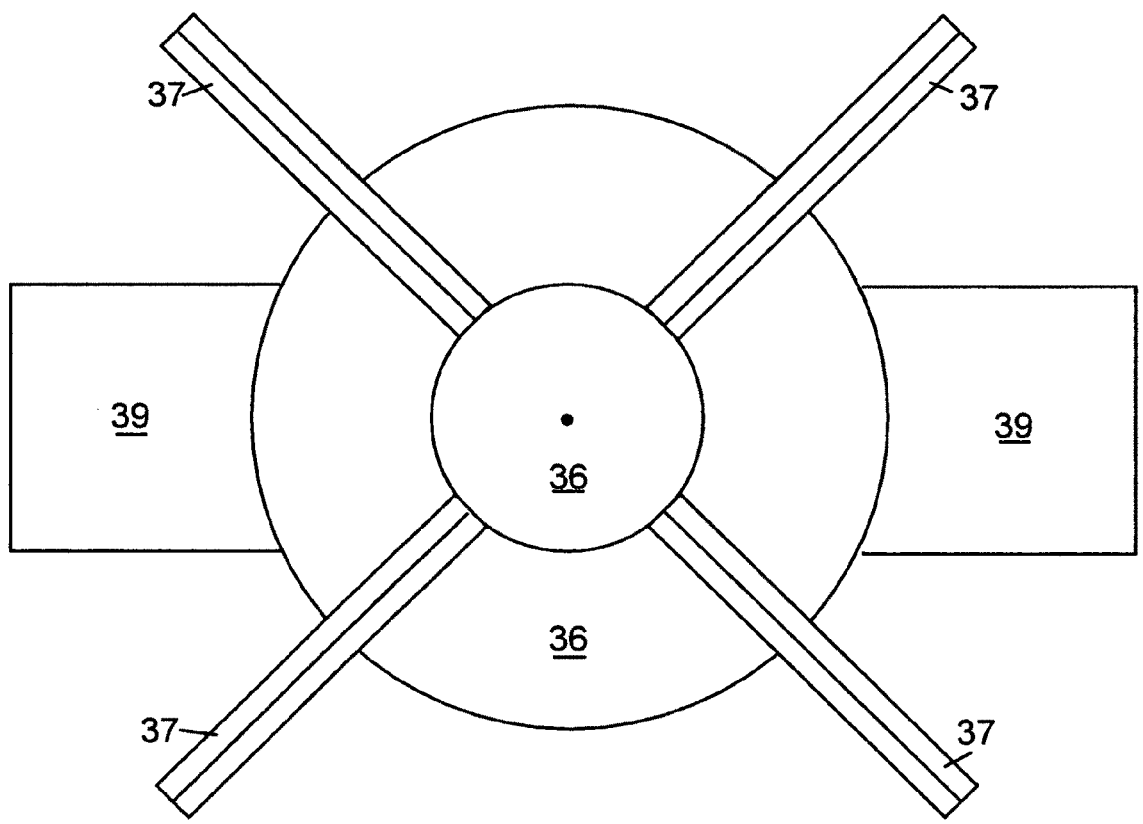
FIG. 5 shows a front view of the chilling air deflector, blades, mixing chamber and exhaust gas intake pipes.

FIG. 5 shows an end view of the chilling air deflector and mixing chamber 36, four chilling, deflecting and supporting blades 37, and exhaust apparatus exhaust gas intake pipes 39.

Figure 6:
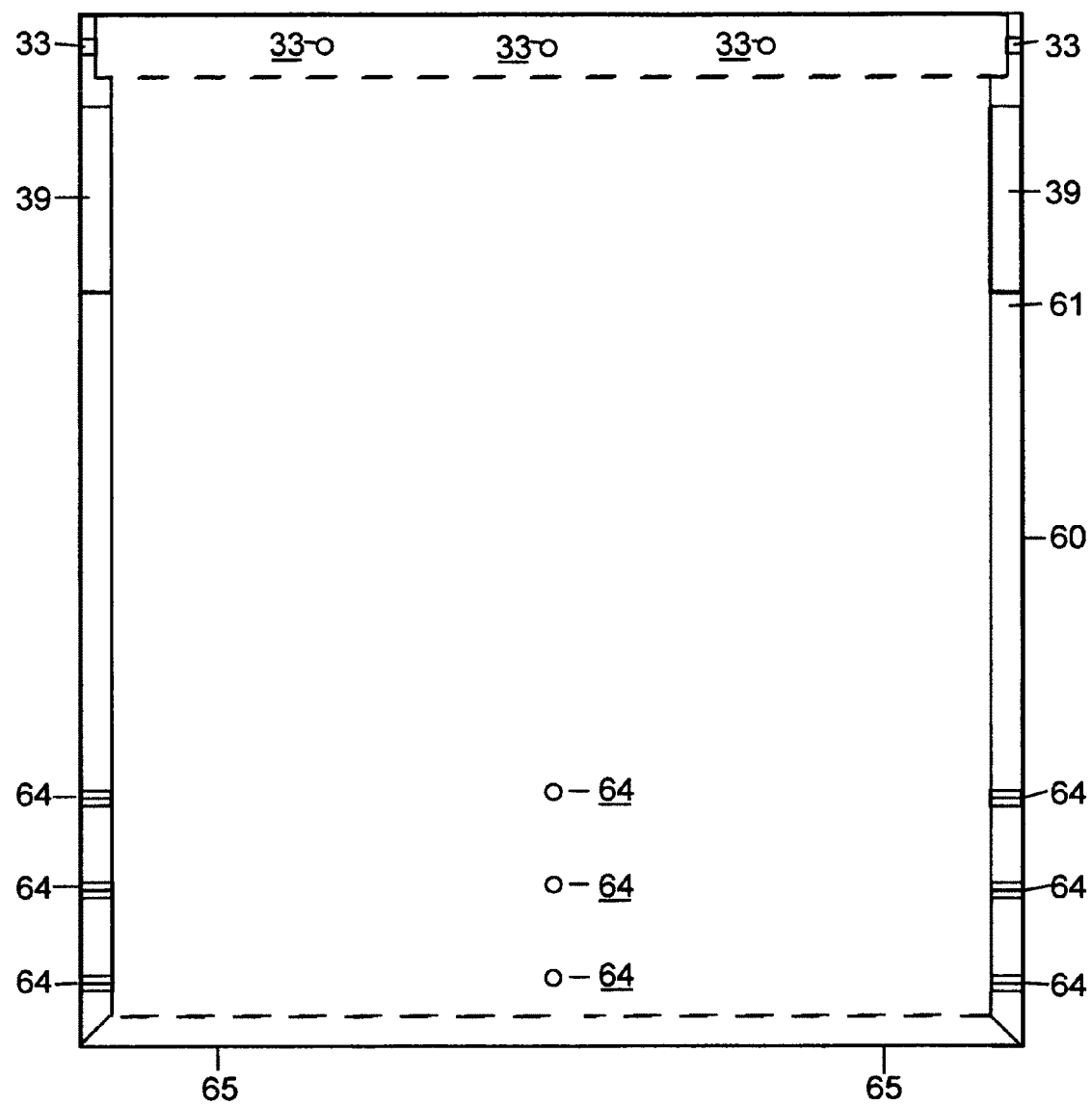
FIG. 6 shows a top view of the rear housing, coupling screws and alignment bolts for blade assembly.

FIG. 6 shows a top view of the rear housing 60, fastening screws 33, exhaust apparatus exhaust gas intake pipes 39, uniform cross-sectional wall 61, rear support adjusting screws 64, and chilled air and exhaust gas mixture discharge port 65.

Figure 7:
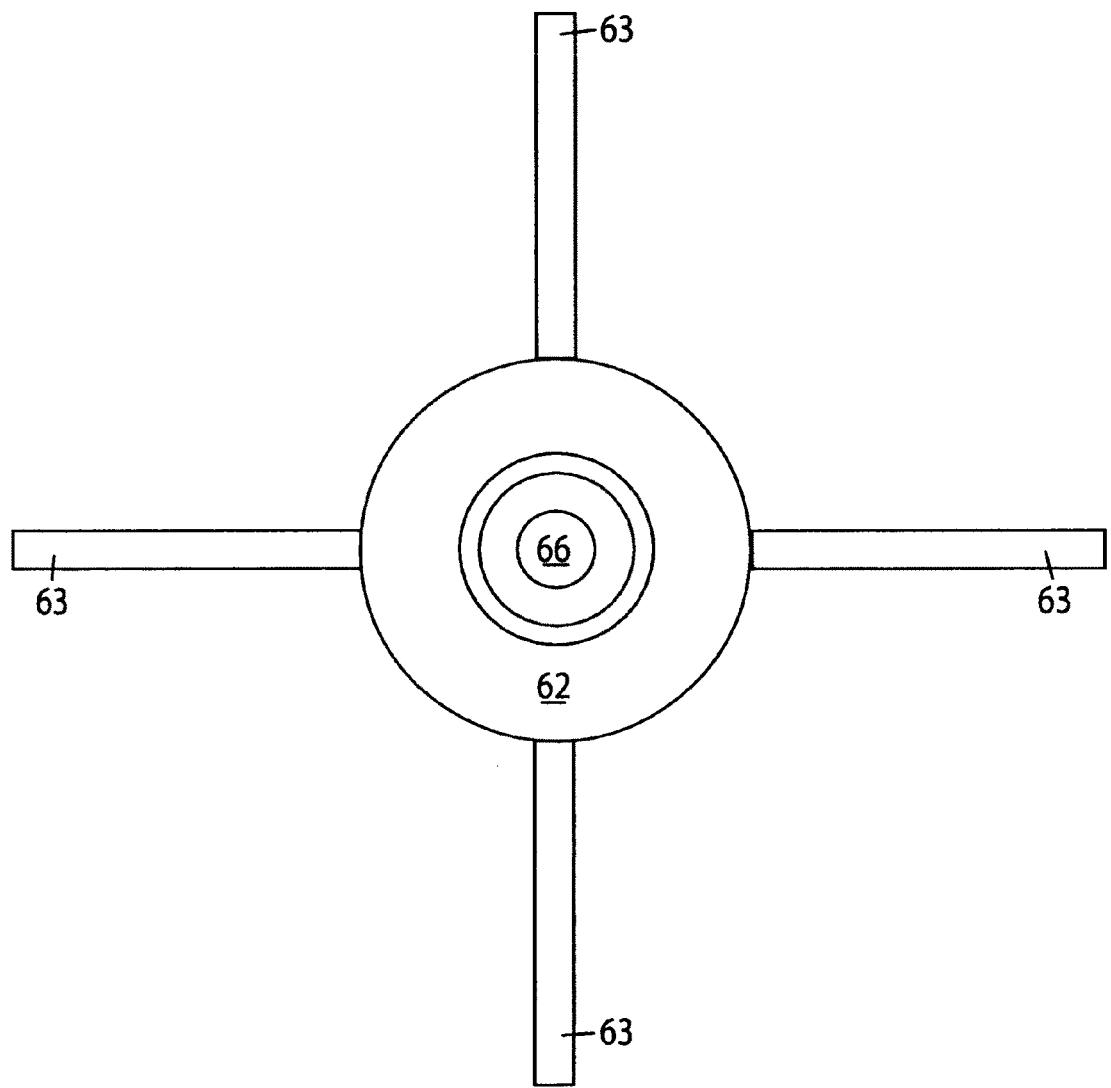
FIG. 7 shows an end view of the rear bearing housing, deflecting blades and rear bearing housing supports and drive shaft.

FIG. 7 shows an end view of the rear bearing housing 62, four deflecting blades and rear bearing housing supports 63 and drive shaft 66.

FIG. 8 shows the sample calculations for the percentage reduction and arithmetic difference in hydrocarbon emissions.

FIG. 9 shows the sample calculations for the percentage reduction and arithmetic difference in carbon monoxide emissions.

FIG. 10 shows the tabulated results for the percentage change and arithmetic difference calculations for exhaust gas emissions produced by a diesel powered engine, with and without the unit running.

FIG. 11 shows the tabulated results for the percentage change and arithmetic difference calculations for exhaust gas emissions produced by a diesel powered engine, with and without the unit running.

FIG. 12 shows a compilation of tabulated test results for the percent change in emissions for tests 1, 2, 3, and 4 of a four gas emission test of a diesel powered engine.

FIG. 13 shows the test data and sample results for diesel engine speed, air velocity, temperature and vacuum with two different nose cones, tests performed on 2001 Aug. 26.

FIG. 14 shows the data sheet for centrifuge vacuum obtained with seven different centrifuge and blade configurations, at different RPM with and without nose cone collar, performed on 2001 Aug. 25 and 2001 Sep. 13.

Figure 15:
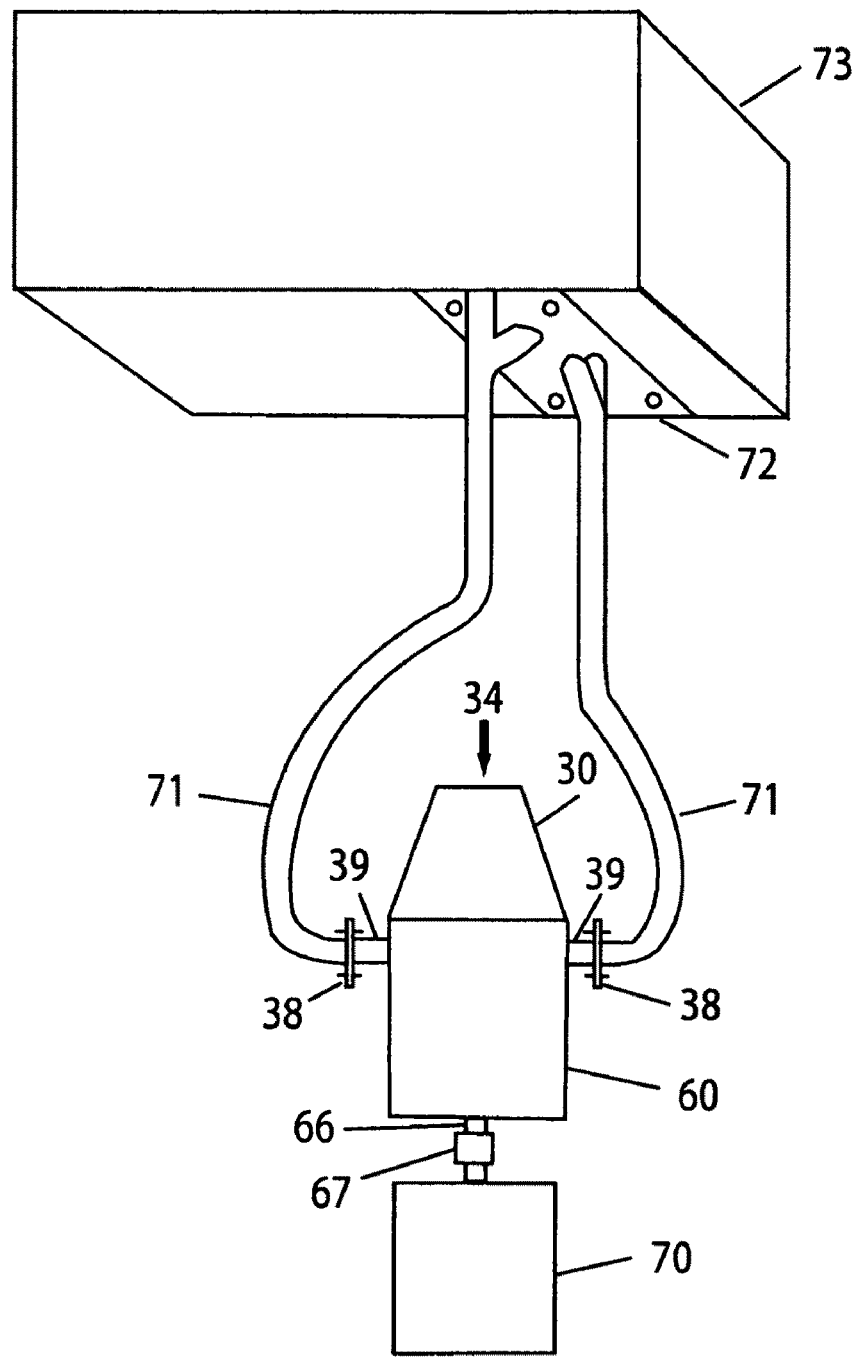
FIG. 15 shows a visual picture of the arrangement of an engine, the exhaust pipes, exhaust apparatus and electrical drive motor.

FIG. 15 shows a visual picture of the arrangement of an engine, the exhaust pipes, exhaust apparatus and electrical drive motor.

OPERATION OF THE INVENTION

Operation

FIG. 1

Electric motor shaft, which is not shown, is inserted into the drive shaft coupling 67, is fastened with coupling bolts 68 and turns drive shaft 66. The drive shaft 66 is fastened to centrifuge and rotating blade assembly 50 and drives the blade assembly 50 which creates a vacuum of 3.3 inches (Hg) and draws ambient air 34 and exhaust gases 43 into the unit. The blade assembly 50 creates a swirling and chilling effect for both the ambient air and exhaust gases. In addition ambient air 34 is drawn into each of the 4 quadrants of the front housing by the blades of chilling, deflecting and supporting blades 37. Within each quadrant, the blades swirl and chill the ambient air 34 to become chilled air 35. The chilled air 35 moves through the unit cooling interior parts and flows parallel to and mixes with the exhaust gases 43 in clearance space between blade assembly and rear housing 57 and in the region behind the first set of blades 52 and beyond those blades of the centrifuge and blade assembly 50. Further mixing occurs in the space between deflecting blades and rear bearing housing supports 63. The chilled air and exhaust gas mixture passes through the four quadrants enclosed by rear bearing housing supports 63 and exits the unit via the exhaust port 65. The vacuum created by the rotating blades 60 also removes virtually all the unburned fuel in the combustion chamber.

Operation

FIG. 2

Ambient air 34 is drawn into the front housing 30 contacts the outer wall of the exhaust apparatus 32 chilling air deflector and mixing chamber and the chilling, deflecting and supporting blades and becoming chilled air 35 as a result. Exhaust gases 43 enter the unit and flow into exhaust gas chilling and mixing chamber 41, pass into the centrifuge mixing chamber 51, strike the deflecting collars 52 enter deflecting exhaust gas entry ports 54, pass through the blades of centrifuge and blade assembly 50 and exit through deflecting blade exhaust exit ports 55. Exhaust gas 42 mixes with chilled air 35 in clearance space between blade assembly and rear housing 57 and in the region behind the first set of blades 52 and beyond those blades of the centrifuge and blade assembly 50. Further mixing occurs in the space between deflecting blades and rear bearing housing supports 63. Chilled air 35 flows parallel to and mixes with the exhaust gases 43 and becomes chilled air and exhaust gas mixture 58, which exits through the chilled air and exhaust gas discharge port 65.

Operation

FIG. 15

A four cylinder engine is connected to the exhaust apparatus 20 by exhaust pipes which leave the engine and enter into the exhaust apparatus 20 where exhaust gases 43 become chilled and temperatures are lowered from approximately 464 degrees Fahrenheit at the engine to an exhaust temperature of approximately 120 degrees Fahrenheit at the rear of the exhaust apparatus. The surface temperature of the exhaust pipes leaving the engine exhaust flanges is approximately 464 degrees. In the short distance from the engine exhaust and turbine entrance flanges 38 connecting the exhaust pipes to the exhaust apparatus 20 the temperature drops to approximately 158 degrees, which is approximately a 300 degree temperature drop. Then in the short one inch distance from the connecting engine exhaust and turbine entrance flanges 38 to the outer surface of the exhaust apparatus 20 an astounding approximately 100 degrees change of temperature takes place. Therefore, from the engine to the outer surface of the exhaust apparatus 20 is a drop in temperature of approximately 360 degrees. Within the exhaust apparatus 20 itself, when it is in motion, a great change in temperature takes place. The exhaust gases 43 come out of the deflecting blade exhaust gas exit ports 55 and blend with the chilled air 35, becoming the chilled air and exhaust mixture 58 at a temperature of approximately 120 degrees when expelled from the unit. The surface skin of the rear housing 60 of the exhaust apparatus 20 is approximately 97 degrees. See Operation—FIGS. 1 and 2. See FIG. 13 for detail of vacuum attained and air velocity flows and how the vacuum changes the temperatures of the exhaust system.

This embodiment of the exhaust apparatus 20 is not to be limited by the embodiment shown and described above but only in accordance with the scope of the appended claims. For example, it is believed that the embodiment of the exhaust apparatus 20 can control temperatures in conventional chemical and electricity producing plants including refineries. Result: surprisingly low exhaust temperatures of downstream products and by-products. Hence, unit designs can be maximized, say reducing the number of cooling towers and/or height or number of emission reducing stacks as well as allowing different fuel charge such as garbage.

ADVANTAGES

From the description, test data, calculations and tabulated results above, a number of advantages of this embodiment of the exhaust apparatus become evident:

(a) The unit can be used to create a vacuum at the exhaust valves of the engine which serves to remove virtually all the unburnt fuel in the combustion chamber, which significantly reduces greenhouse gases including (CO and $CO_2$), hydrocarbon emissions (HC), oxides of nitrogen emissions ($NO_x$) and other gases and pollutants not yet required to be tested.

(b) The unit can be used to produce a major increase in cooling of exhaust gases, and a major increase in obtainable vacuum.

(c) This unit is driven from the rear for ease of placement.

(d) This unit contains a rotating mixing chamber that allows the gases to be blended and separated more easily.

(e) This embodiment of the exhaust apparatus has few moving parts, making it easier to manufacture and assemble. This embodiment of the exhaust apparatus significantly reduces the following engine performance factors:

(f) Back-pressure
(g) Exhaust noise
(h) Exhaust temperature
(i) Exhaust pollutants Although the description above contains many specificities, these should not be construed as limiting the scope of the embodiment but as merely providing illustrations of some of the presently preferred embodiments.

CONCLUSION, RAMIFICATION, AND SCOPE

Accordingly, the reader can see that this unit can be used to reduce pollution in the form of greenhouse gases (CO and $CO_2$), hydrocarbon emissions (HC), oxides of nitrogen emissions ($NO_x$) and other gases & pollutants not yet required to be tested. In addition, this unit can be used to produce a major increase in both the cooling of exhaust gases, and a major increase in obtainable vacuum in the exhaust system. This unit has fewer moving parts, is easier to manufacture and assemble. Furthermore, the unit significantly reduces the following engine performance factors: back-pressure, exhaust noise, engine and exhaust temperatures, and exhaust pollutants. Also the unit can be used to extend engine life, extend oil life, relieve the crystallization of engine parts, increase power, provide greater engine efficiency, and increase gas mileage.

Although the description above discusses many specificities, these should not be construed as limiting the scope of the exhaust apparatus but merely providing some of the features of this exhaust apparatus. For example, the unit was primarily fabricated from aluminum, but the unit could be fabricated of ferrous or other non-ferrous alloys, metals, plastic, glass, chemical elements, phenolic resin, other resins or any other material that is suitable for this application. This unit was formed by machining but it could also be cast, extruded, molded, pressed, poured or any other forming process.

What I claim as my invention is:

1. An exhaust apparatus for a diesel driven internal combustion engine, said apparatus (20) comprising:
    a. an ambient air intake chilling assembly, a front housing (30), a rear housing (60) and a cantileverly mounted centrifuge rotating blade assembly (50) supported by said rear housing (60)
    b. means for powering said rotating blade assembly (69)
    c. a stationary exhaust gas chilling and mixing chamber (41),
    d. said rotating blade assembly (50) includes deflecting blade chilled exhaust gas exit ports (55),
    e. said rear housing (60) additionally supporting, a rear bearing housing (62), and combination rear deflecting blades, and rear bearing housing supports (63),
    f. said exhaust gas apparatus (20) including means for connecting a diesel powered engine exhaust to said apparatus (20) wherein said exhaust gases are fed radially into a region of maximum vacuum created by said rotating blade assembly then flowing parallel with chilled air (35) but not in contact therewith along an axis of symmetry, thence radially outwardly into swirling heat exchange contact with said chilled air (35) thereby reducing the back pressure of said engine and increasing the performance thereof.

2. The exhaust apparatus (20) of claim 1 wherein said ambient air intake chilling assembly includes a frustum-conically shaped wall of said front housing (30) attached to an equi-diametered wall of said rear housing (60) and an inlet (31) that allows the ambient air to flow in the space between an inter wall of said front housing (30) and an outer wall thereof through chilled air deflecting blades (37) which are attached to a leading edge of said front housing (30).

3. The exhaust apparatus (20) of claim 2 wherein said exhaust gas assembly chilling and mixing chamber (41) includes a pair of diametrically opposed turbine exhaust gas intake pipes (39) having a first end attached to a central segment (51), of a chilling air deflector and mixing chamber (36) of said support assembly, chilling, deflecting and supporting blades (37) at opposed openings of said exhaust gas chilling and mixing chamber (41), said central segment, chilling air deflector and mixing chamber (36) includes an internal cavity of said exhaust gas chilling and mixing chamber (41), bisected by longitudinal spaced conically shaped said centrifuge front deflectors (42), wherein said exhaust gases (43) enter into internal cavity of said exhaust gas chilling and mixing chamber (41), via openings into said chilling air deflector and mixing chamber (36), impact upon upstream deflector, said engine exhaust and turbine entrance flanges (38), flow parallel with said chilled air (35) but separate therefrom, thence impact upon said downstream centrifuge front deflector (42) and outwardly via deflecting blade exhaust gas entry ports (54) to contact said centrifuge and rotating blade assembly (50), discharging said exhaust gases (43) through said deflecting blade exhaust gas exit ports (55) into blend of said chilled air and exhaust gas mixture (58).

4. The exhaust apparatus (20) of claim 3 wherein said centrifuge and rotating blade assembly (50) includes a series of exhaust deflecting blades (53) each attached to said centrifuge and rotating blade assembly (50) and outwardly terminating adjacent to but not in contact with the uniform cross-sectional wall (61) of the chilled air and exhaust gas mixture discharge port (65).

5. The exhaust apparatus (20) of claim 4 wherein said chilled air and exhaust gas mixture discharge port (65) includes the uniform cross-sectional wall (61) and terminating out of the rear housing (60).

6. The exhaust apparatus (20) of claim 5 wherein a drive shaft (66) penetrates a rear bearing housing (62), said rear deflecting blades, and said rear bearing housing supports (63), said drive shaft (66) ends in drive shaft coupling (67) for attachment to an electric motor drive shaft (69).

7. A method for improving the performance of a diesel driven internal combustion engine comprising installing said apparatus of claim 1 in said exhaust system of said diesel powered engine, thereby reducing the back pressure of said engine and increasing the performance thereof.

8. The method of claim 7 wherein a vacuum range created by said apparatus is from about 1 to 5 pounds per square inch relative to atmospheric.

* * * * *